United States Patent
Lee et al.

(10) Patent No.: US 6,822,695 B2
(45) Date of Patent: Nov. 23, 2004

(54) SURROUNDING LIGHT JUDGING METHOD AND VIDEO COMPENSATION CONTROL APPARATUS USING THE SAME

(75) Inventors: Sang Hun Lee, Kyungsangbuk-Do (KR); Ja Hwan Koo, Daegu (KR); Duk Kyu Choi, Daegu (KR); Kyu Ik Song, Daegu (KR); Ki Ryong Kwon, Busan (KR); Sung Kyu Jeon, Kyungsangbuk-Do (KR); Byung Gon Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/274,150

(22) Filed: Oct. 21, 2002

(65) Prior Publication Data

US 2003/0043299 A1 Mar. 6, 2003

Related U.S. Application Data

(63) Continuation of application No. 08/954,076, filed on Oct. 20, 1997.

(30) Foreign Application Priority Data

Mar. 8, 1997 (KR) ............................................. 97-7833
Mar. 14, 1997 (KR) ............................................. 97-8800

(51) Int. Cl.[7] .............................. H04N 9/73; H04N 5/58
(52) U.S. Cl. ...................... 348/603; 348/602; 348/655; 348/223.1; 348/227.1

(58) Field of Search ................................. 348/603, 604, 348/602, 655, 658, 687, 673, 223.1, 227.1, 659, 661, 224.1; 382/274, 162, 167, 169, 275; 345/207, 690, 77, 81, 83; 358/516, 518, 520, 521

(56) References Cited

U.S. PATENT DOCUMENTS

| | | | |
|---|---|---|---|
| 4,739,392 A | * 4/1988 | Ueda et al. | 348/225.1 |
| 4,774,564 A | * 9/1988 | Konishi | 348/224.1 |
| 5,153,713 A | * 10/1992 | Kyuma et al. | 348/655 |
| 5,504,524 A | * 4/1996 | Lu et al. | 348/223.1 |
| 5,654,753 A | * 8/1997 | Takei | 348/223.1 |

* cited by examiner

*Primary Examiner*—Michael H. Lee
*Assistant Examiner*—Jean W. Désir
(74) *Attorney, Agent, or Firm*—Birch, Stewart, Kolasch & Birch, LLP

(57) ABSTRACT

A surrounding light judging method and a video compensation control apparatus which are capable of securing an optimum quality of picture by detecting a color signal near a video displaying instrument, judging a lighting environment from the detected color signal, and automatically correcting a video data in accordance with the judged lighting environment and a variation in the lighting environment. The method includes the steps of detecting a first color component and a second color component from a surrounding light, and judging a kinds of the light using the first and second color components

31 Claims, 14 Drawing Sheets

FIG. 2A
CONVENTIONAL ART

| SUM OF R,G & B(S) / ITEM | 0≤S<2 (0–10lux) | 2≤S<10 (10–30lux) | 10≤S<20 (30–50lux) | 20≤S<31 (50–70lux) | 31≤S<37 (70–85lux) | 37≤S<45 (85–100lux) | 45≤S (100lux–) |
|---|---|---|---|---|---|---|---|
| CONTRAST | 30 | 40 | 55 | 70 | 85 | 93 | 100 |
| BRIGHTNESS | 40 | 42 | 46 | 50 | 54 | 57 | 60 |
| SATURATION | 40 | 41 | 45 | 48 | 51 | 53 | 55 |
| SHARPNESS | 30 | 33 | 39 | 45 | 51 | 55 | 60 |
| LIGHTING | NO LIGHT (DARKROOM) | INDIRECT (1) | INDIRECT (2) | STANDARD | STRONG (1) | STRONG (2) | DAYLIGHT |
| COMPENSATION STEP | FIRST | SECOND | THIRD | FOURTH | FIFTH | SIXTH | SEVENTH |

FIG. 2B
CONVENTIONAL ART

| VALUE OF R,G & B | | WHITE BALANCE (COLOR TEMPERATURE) | COLOR COORDINATE | | LIGHTING |
|---|---|---|---|---|---|
| | | | X | Y | |
| R+G+B≥45 | | 13000°K | 266 | 280 | DAYLIGHT |
| R+G+B<2 | | 9000°K | 270 | 284 | DARKROOM |
| 2≤R+G+B<45 | 0≤B−R | 12000°K | 274 | 289 | FLUORESCENT LAMP |
| | 1≤R−B≤4 | 11000°K | 279 | 296 | FLUORESCENT LAMP + INCANDESCENT LAMP |
| | 5≤R−B | 10000°K | 285 | 303 | INCANDESCENT LAMP |

FIG.5A

| NO | LIGHTING | COLOR TEMP(W/B) | TINT | X-AXIS | SUB-COLOR | REMARKS |
|---|---|---|---|---|---|---|
| 1 | DAYLIGHT(D65) | 11000 °K | G→1 | JAPAN | | RATIO>2 |
| 2 | LIGHT SOURCE "C" (FLUORESCENT LAMP) | 9500 °K | G→3 | JAPAN | LIGHT SOURCE "A" OR DARK STATE SUB-COLOR →2 | 1<RATIO<2 |
| 3 | LIGHT SOURCE "A+C" | 8500 °K | G→4 | US | | 0.8<RATIO<1 |
| 4 | LIGHT SOURCE "A" (INCANDESCENT LAMP) | 7500 °K | G→7 | US | | RATIO<0.8 |
| 5 | FACTORY SETTING | 12000 °K | 0 | JAPAN | | — |

SURROUNDING LIGHT JUDGING METHOD AND VIDEO COMPENSATION CONTROL APPARATUS USING THE SAME

This application is a continuation of co-pending Application Ser. No. 08/954,076, filed on Oct. 20, 1997, the entire contents of which are hereby incorporated by reference and for which priority is claimed under 35 U.S.C. §120; and this application claims priority of Application Ser. No. 7833/1997 filed in Korea on Mar. 8, 1997 and Application Ser. No. 8800/1997 filed in Korea on Mar. 14, 1997 under 35 U.S.C. §119.

BACKGROUND OF THE INVENTION

1. Field of the Invention

The present invention relates to a surrounding light judging method and a video compensation control apparatus using the same, and in particular to an improved surrounding light judging method and a video compensation control apparatus using the same which are capable of providing an optimum viewing quality by automatically correcting video data in accordance with a surrounding lighting environment of a video displaying instrument.

2. Description of the Conventional Art

Generally, a color adaptation phenomenon is defined as a phenomenon where an original color is recognized by human eyes as another color because the human eyes are made adaptive by a predetermined light such as an incandescent light, a fluorescent light, etc.

Therefore, a television viewer may recognize the colors reproduced by a color picture tube as other colors by the above-described color adaptation phenomenon, so that it is impossible to enjoy the optimum quality of colors. Thus, video data is corrected based on the surrounding light environment using a video correction (compensation) apparatus to provide an optimum quality of colors.

As shown in FIG. 1, the conventional video compensation apparatus includes an RGB sensor 10 for detecting RGB data based on the surrounding environment, a key selector 20, a microcomputer 30 for summing RGB data detected by the RGB sensor 10 and outputting a video compensation data corresponding to the summed value, and a combined video signal processor 40 for processing a combined video signal received through the antenna and recovering a video signal and an audio signal.

The combined video signal processor 40 includes a tuner 11 for selecting a predetermined channel, an IF processor 12 for converting the combined video signal of the selected channel into an intermediate frequency signal, a detector 13 for detecting an intermediate frequency signal from the IF processor 12 and separating the detected intermediate frequency signal into a video intermediate frequency signal and an audio intermediate frequency signal, an audio processor 14 for recovering the audio intermediate frequency signal from the detector 13 and outputting the recovered signal to a speaker 15, and a video processor 16 for recovering the video intermediate frequency signal from the detector 13 to an RGB signal in accordance with the video compensation data output from the microcomputer 30.

The operation of the conventional video compensation apparatus will now be explained with reference to the accompanying drawings.

First, after the television is turned on using the key selector 20, when a predetermined selection key is inputted, the microcomputer 30 outputs a channel selection data based on the output from the key selector 20.

In addition, the microcomputer 30 receives an RGB data with respect to the surrounding environment detected by the RGB sensor 10, sums the RGB data ($S=D_R+D_G+D_B$), compares the previously set control data table shown in FIG. 2A with the sum value S of the RGB data, judges the surrounding light level and sets a control data and a W/B (White/Balance) corresponding to the judged surrounding light level.

Namely, as shown in FIGS. 2A and 3A, when the sum value (S) is $0 \leq S \leq 2$, the microcomputer 30 judges the surrounding environment as a dark room, sets the control data as Contrast=30, Brightness=40, Saturation=40, and sharpness=30, and performs a first compensation step in Steps S3 and S4. When the sum value S is $2 \leq S < 45$ as in Step S5, the control data based on the sum value S is set, and the second through sixth compensation steps are performed as shown in Steps S5 through S14 of FIG. 3A.

In addition, when the sum value S is $45 \leq S$, the microcomputer 30 judges the surrounding light as a daylight sets the control data as Contrast=100, Brightness=60, Saturation=55 and sharpness=60, and performs a seventh compensation step as in Step S15.

More particularly, in the first through seventh compensation steps, the microcomputer 30, as shown in FIGS. 2B and 3B, judges that the surrounding light corresponds to a dark room light when the sum value S is S<2, sets the W/B to 9000° K in Steps S20 through S23. When the sum value S is $S \geq 45$, the surrounding light is judged as a daylight, and then the W/B is set as 1300° K in Steps S24 and S25. When the sum value S is $2 \leq S < 45$, the W/B is set in accordance with the subtracted value between R and B in Step S26.

Namely, when the subtracted value S1 is $S1 \leq 0$, the surrounding light is judged to be a fluorescent lamp, and then the W/B is set as 12000° K in Steps S27 and S28. When the subtracted value is $S1 \leq 5$ the surrounding light is judged to be a fluorescent light and an incandescent lamp, and the W/B is set to 11000° K in Steps S29 and S30. When the subtracted value is $S1 \geq 5$, the surrounding light is judged to be an incandescent lamp, and the W/B is set to 1000° K in Step S31.

The control data and W/B determined by the microcomputer 30 based on the detected surrounding light, as described above, are used to adjust video signals prior to being displayed on the tube 17. For example, the tuner 11 selects a predetermined channel in accordance with the channel selection data from the microcomputer 30, and the IF processor 12 converts the combined video signal of the selected channel into an intermediate frequency signal. The detector 13 separates the converted intermediate frequency signal into a video intermediate frequency signal and an audio frequency signal.

Consequently, the separated audio intermediate frequency signal is recovered to an audio signal by the audio processor 14 and outputted to the speaker 15. The video processor 16 receives a video intermediate frequency signal from the detector 13, compensates the video signals in accordance with the video compensation data set by the microcomputer 30 and the W/B, and displays the compensated video signals on the color picture tube 17.

However, in the conventional video compensation apparatus, when the brightness of the surrounding light is decreased, the sum value S is decreased. Then, the brightness of the surrounding light may be erroneously detected due to the low sum value S, which can cause a malfunction in the system.

In addition, when the brightness of the surrounding light reaches a certain high value, for example, $S \geq 46$, the microcomputer 30 sets the W/B to 13000° K regardless of how high S may be. In this manner, it is impossible to accurately set the W/B based on the judged brightness, especially when the sum value S is high.

Furthermore, in the conventional video compensation apparatus, since the color adaptation phenomenon is not considered, it is impossible to secure a quality picture.

SUMMARY OF THE INVENTION

Accordingly, it is an object of the present invention to provide a surrounding light judging method and a video compensation control apparatus using the same which overcome the aforementioned problems encountered in the conventional art.

It is another object of the present invention to provide an improved surrounding light judging method and a video compensation control apparatus which are capable of providing an optimum quality of picture by detecting a color signal near a video displaying instrument, judging a lighting environment from the detected color signal, and automatically correcting video data in accordance with the judged lighting environment and a variation in the lighting environment.

To achieve the above and other objects, there is provided a surrounding light judging method which includes the steps of detecting a first color component and a second color component from a surrounding light, and judging a kinds of the light using the first and second color components.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is a setting table of control data based on a sum value S, which is used in the conventional apparatus of FIG. 1;

FIG. 2B is a setting table of W/B based on a sum value S, which is used in the conventional apparatus of FIG. 1;

FIG. 5A is a table illustrating video compensation data corresponding to a surrounding light judged by a color component ratio according to one embodiment of the present invention;

DETAILED DESCRIPTION OF THE PREFERRED EMBODIMENTS

Figure 1:
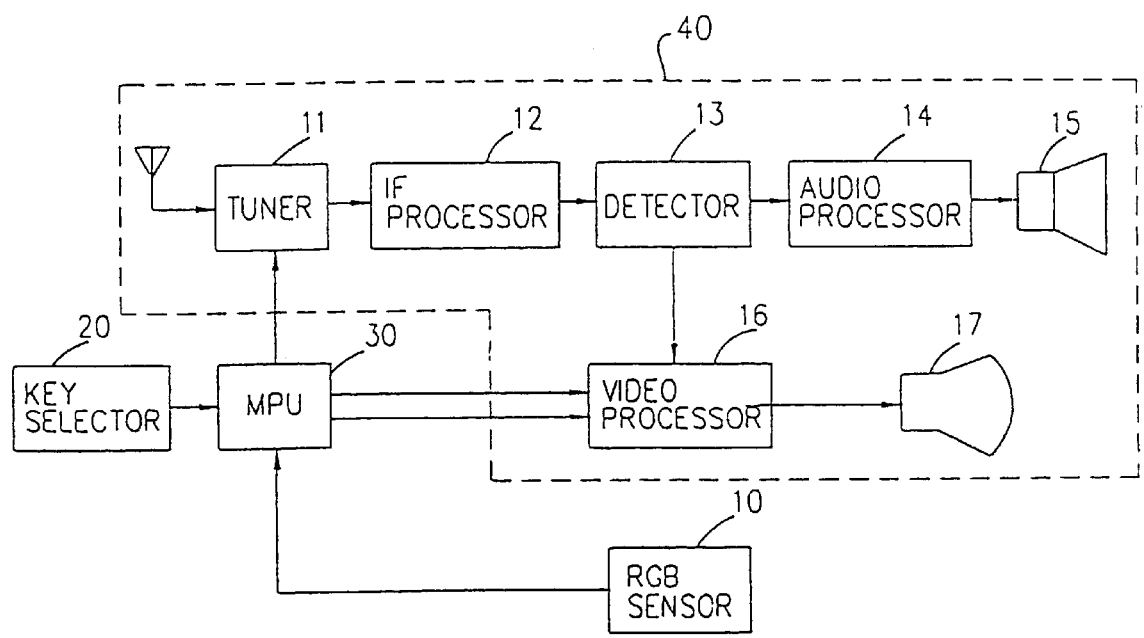
FIG. 1 is a bock diagram illustrating a conventional video compensation apparatus.
Figure 3A:
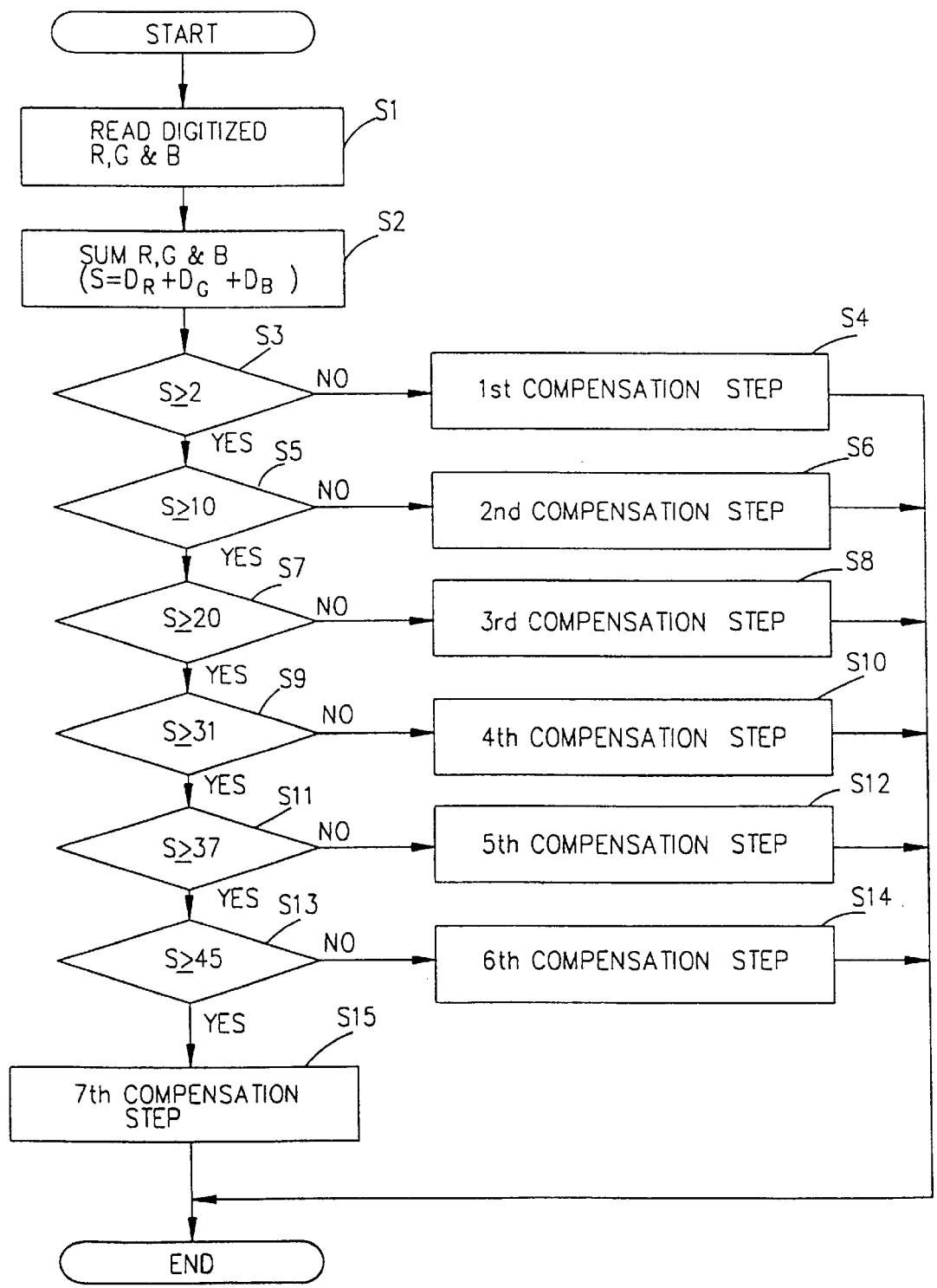
FIG. 3A is a flow chart illustrating compensation steps based on a sum value S, which are used in the conventional apparatus of FIG. 1.
Figure 3B:
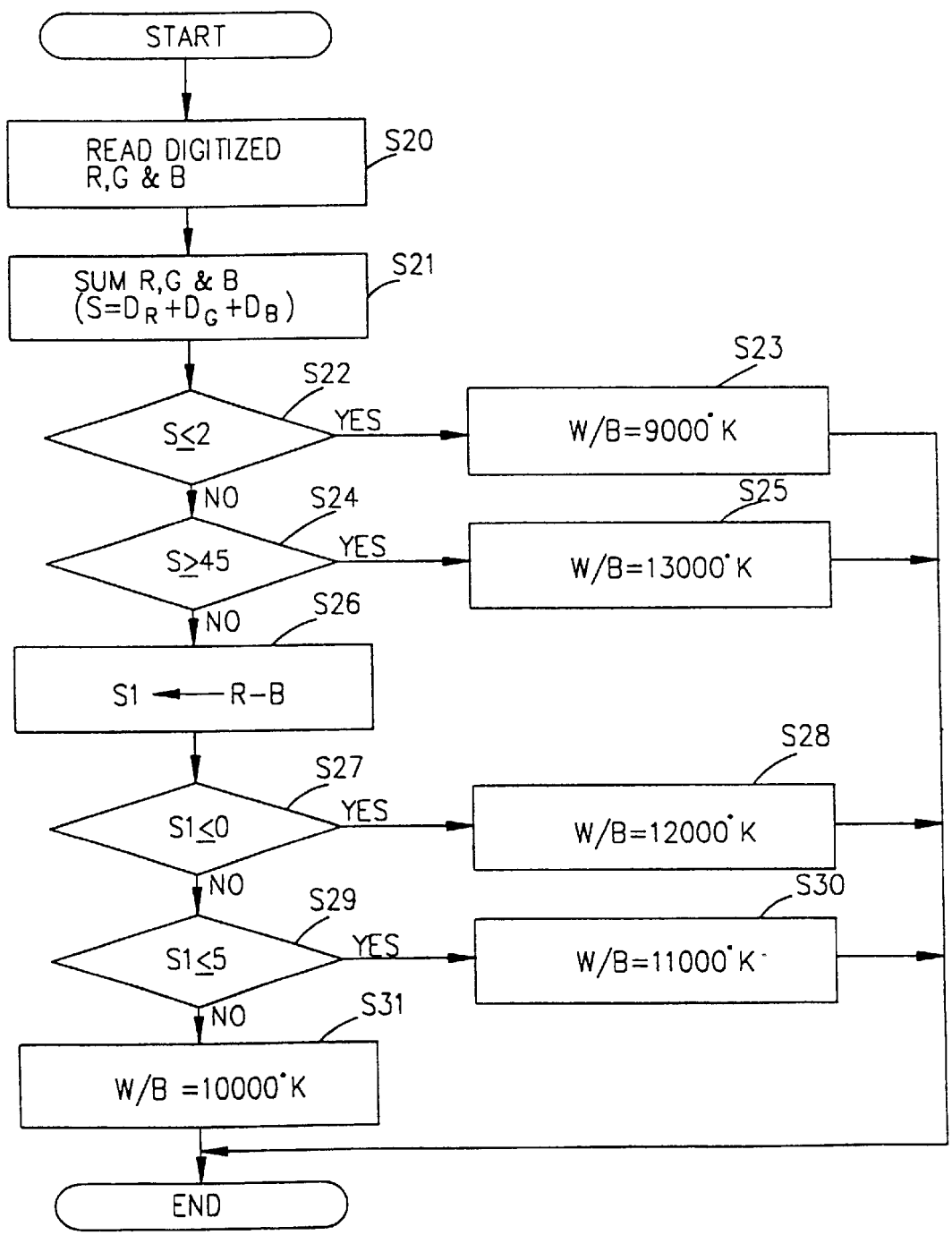
FIG. 3B is a flow chart illustrating W/B setting steps based on a sum value S and subtracted value S1, which are used in the conventional apparatus of FIG. 1.
Figure 4A:
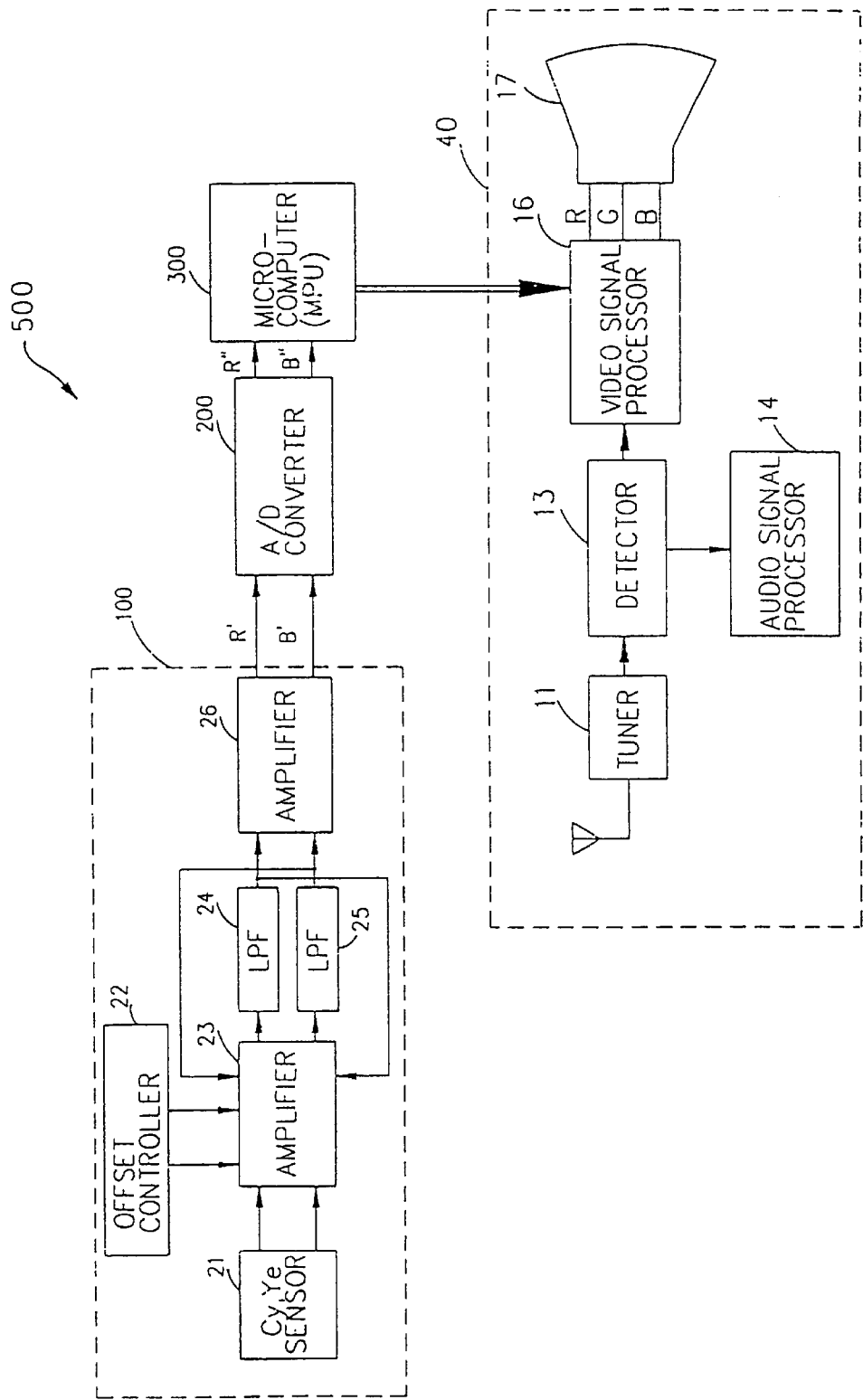
FIG. 4A is a block diagram illustrating a video compensation control apparatus according to one embodiment of the present invention.

FIG. 4A illustrates a video compensation control apparatus 500 according to the present invention. The apparatus 500 includes a color detector 100 for detecting a Cy and Ye color component from the component of a surrounding light and thereby outputting R' and B' values, an A/D converter 200 for analog-to-digital converting the R' and B' values from the color detector 100 and thereby outputting R" and B" values, a microcomputer (MPU) 300 for judging characteristics (e.g., type) of a surrounding light in accordance with the R" and B" values converted by the A/D converter 200 and outputting video compensation data in accordance with the judged light characteristics, and a combined video signal processor 40 for processing the combined video signals received through an antenna, recovering the received signals into a video signal and an audio signal, and processing the video signal based on the video compensation data output from the MPU 300.

Figure 4B:
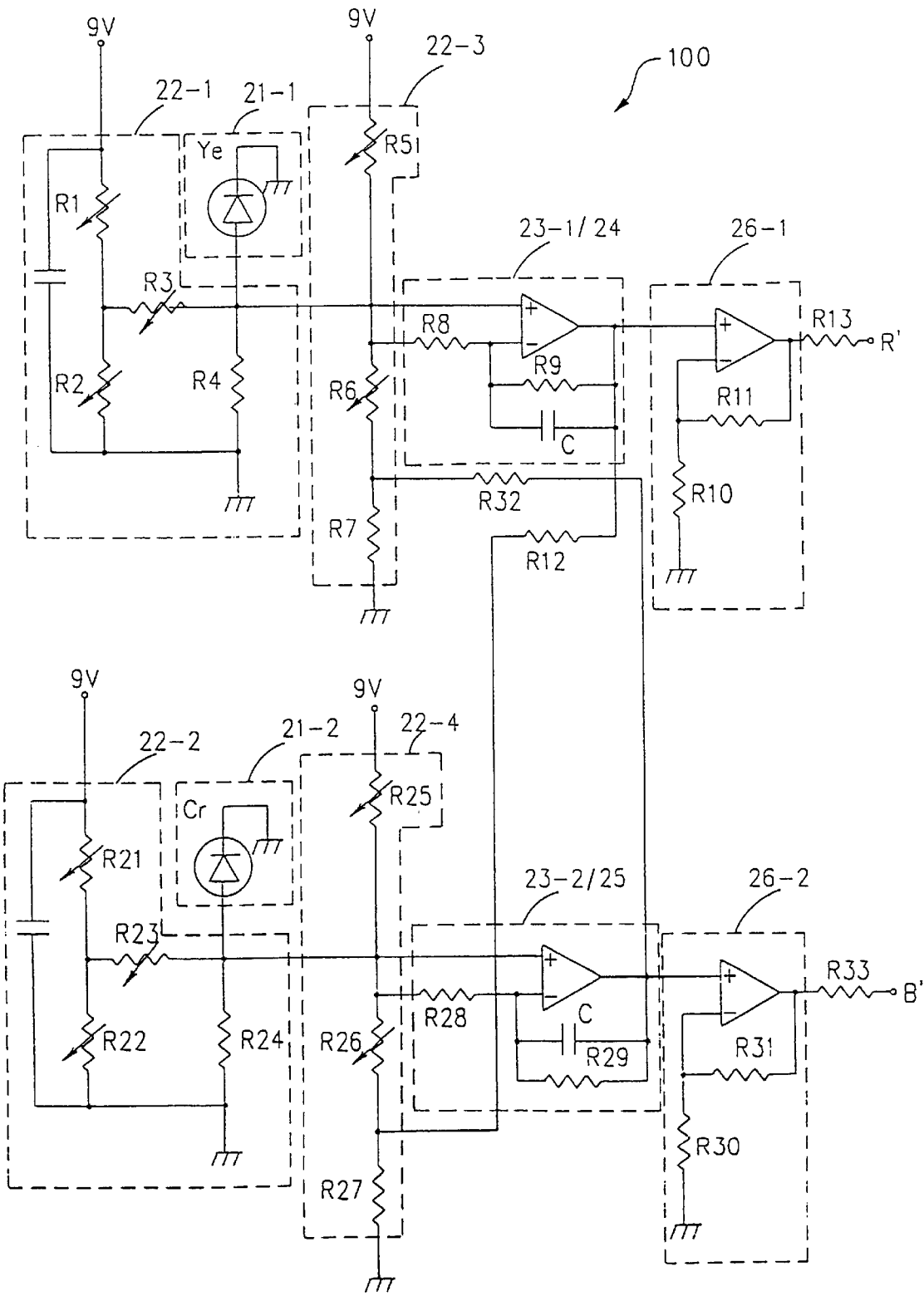
FIG. 4B is a detailed circuit diagram illustrating a color detector in the apparatus of FIG. 4A.

As shown in FIG. 4B, the color detector 100 includes a Cy and Ye sensor 21 (21-1 and 21-2), an offset controller 22 (22-1, 22-2, 22-3, 22-4), an amplifier 23 (23-1 and 23-2), low pass filters 24 and 25, and an amplifier 26 (26-1 and 26-2). The circuit of the amplifier 23 can be combined with the circuit of the low pass filter 24 or 25 as indicated by the dotted box shown in FIG. 4B.

The combined video signal processor 40 is configured identically to the conventional art. Therefore, in the drawings, only the tuner 11, the detector 13, the audio signal processor 14, the video signal processor 16 and the CPT 17 are shown therein.

The operation of the video compensation control apparatus 100 according to the present invention will now be explained with reference to the accompanying drawings.

When the Cy and Ye sensors 21-1 and 21-2 of the color detector 100 detect Cy and Ye color components from the light near a color display instrument, the amplifiers 23-1 and 23-2 amplify the Cy and Ye color components detected in accordance with the offset voltage set by the input offset voltage controllers 22-1 and 22-2 and the output off set voltage controllers 22-3 and 22-4. The amplified Cy and Ye color components are filtered by the low pass filters 24 and 25 and outputted as color signals R' and B' through the amplifiers 26-1 and 26-2. At this time, the resistors R12 and R32 control the ratio between the Cy and Ye color components and the color signals R' and B'.

Then, the color signals R' and B' from the color detector 100 are converted into digital color signals R" and B" by the A/D converter 200, and the microcomputer 300 generates various video compensation data based on the digital color signals R" and B".

The video compensation data setting procedures based on the surrounding light characteristics judged using the color signal component ratio will now be explained according to the present invention.

Figure 6:
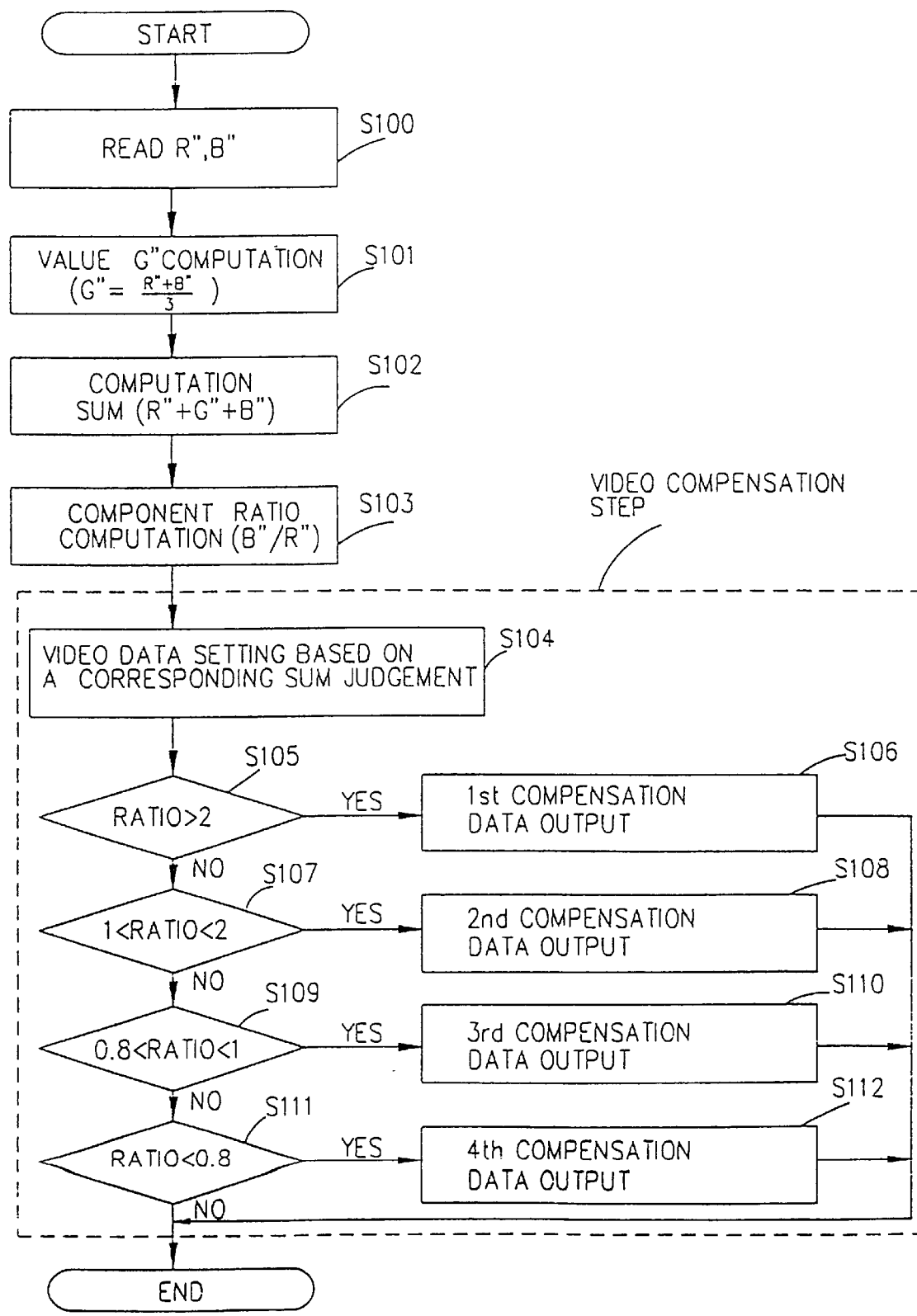
FIG. 6 is a flow chart illustrating a compensation video data setting step and a video compensation step based on a color component ratio according to one embodiment of the present invention.

As shown in FIG. 6, the microcomputer 300 computes in Steps S100 and S101 a value G" from the digital color signals R" and B" output from the A/D converter 200, wherein G"=(R"+B")/3. The computed value G" and values R" and B" are summed (SUM=R"+G"+B") in step S102. In addition, the color signal component ratio (Ratio=B"/R") of the values B" and R" are computed in Step S103.

Figure 5B:
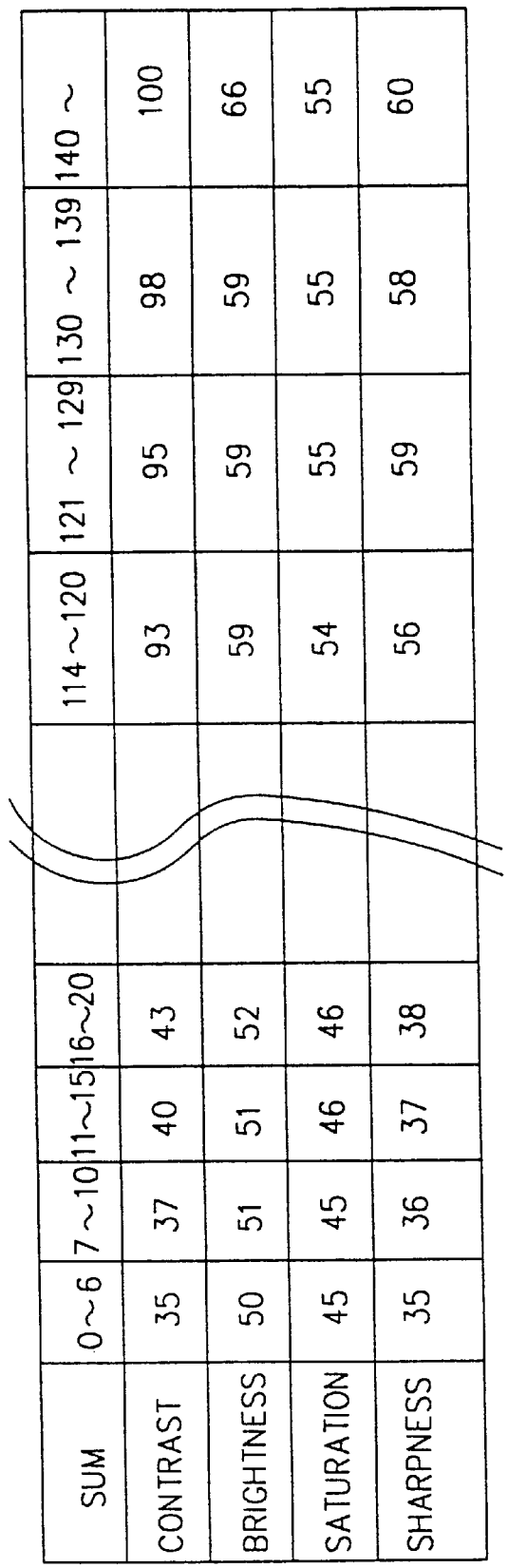
FIG. 5B is a table illustrating a setting value of a video data based on sum value S according to one embodiment of the present invention.

Then, the microcomputer 300 sets in Step S104 the video compensation data based on the sum value (SUM) using a chart such as one as shown in FIG. 5B. The video compensation data includes, but is not limited to, Contrast, Brightness, Saturation, and Sharpness. Then, the MPU 300 judges the type (kind) of the light in accordance with the color signal component ratio (Ratio=B"/R"). The color temperature (W/B), TINT, X-axis, Sub-color, etc. which are previously stored in the table as shown in FIG. 5A are set in accordance with the judged light type for performing a compensation operation.

More specifically, when the color signal component ratio is Ratio>2, then the light is judged as a daylight. Therefore, first compensation data having a color temperature (W/B) of 11000° K, TINT(G)=1, and X-axis=Japan is outputted in Steps S105 and S106. In addition, when the color signal component ratio is 1<Ratio<2, the light is judged as a C-light source (fluorescent lamp), and second compensation data having a color temperature (W/B) of 9500° K, TINT (G)=3, and X-axis=Japan is outputted in Steps S107 and S108.

In addition, the third and fourth compensation data are outputted, respectively, when the color signal component ratio is 0.8<Ratio<1, and the color signal component ratio is Ratio<0.8, for controlling a video signal in Steps S109 through S112.

When the surrounding light corresponds to the night light (dark state), the color signal component ratio is Ratio=0/0, and it is impossible to compute compensation data. In this case, the video signal is controlled using compensation data corresponding to the light source "A".

Consequently, the video signal processor 16 of the combined video processor 40 re-processes the video signals in accordance with the video compensation data output from the microcomputer 300 and displays the processed video signals on the screen of the color picture tube 17. The video compensation data is also stored in memory or other storage unit.

Figure 7A:
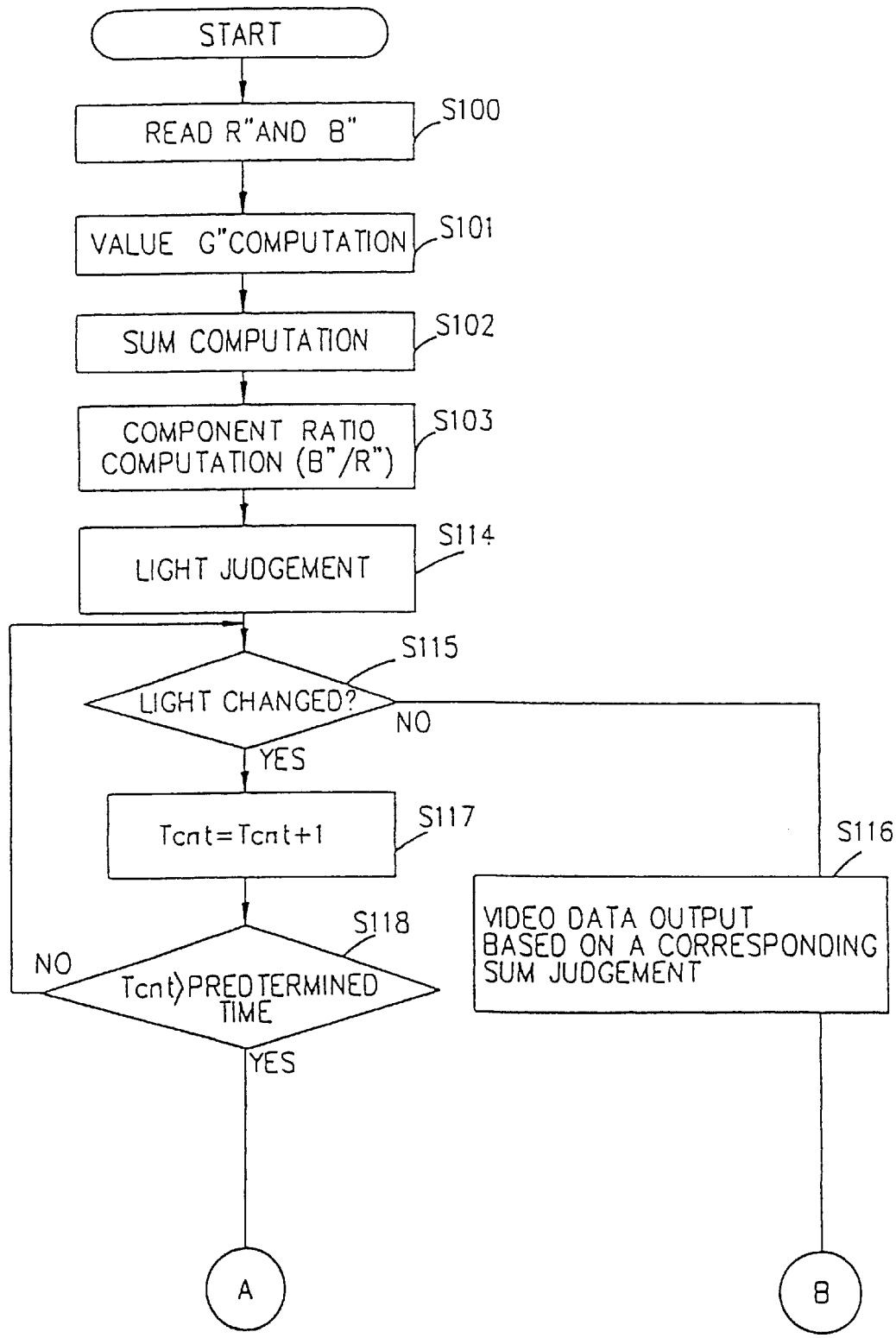
FIGS. 7A and 7B are flow charts illustrating a light change detecting step based on a color component ratio and a video compensation step based on a color characteristic according to one embodiment of the present invention.

After the video signal is compensated, the microcomputer 300 continuously receives color signals R" and B" output by the A/D converter 200, computes a value G", a SUM value, and a ratio, and determines characteristics of the surrounding light using the computed values (e.g., color signal component ratio) in Steps S100–S114 in FIG. 7A.

The recently computed color signal component ratio and the previously stored color signal component ratio are then compared to each other to determine whether the surrounding light is varied in Step S115. At this time, if the light is not varied, the video compensation data is outputted in accordance with the sum value SUM in Step S116. If the light is varied, in steps S117 and S118, the current video compensation data is maintained for a predetermined time based on the color adaptation phenomenon of eyes, and then a video compensation operation is performed based on the color adaptation.

Figure 7B:
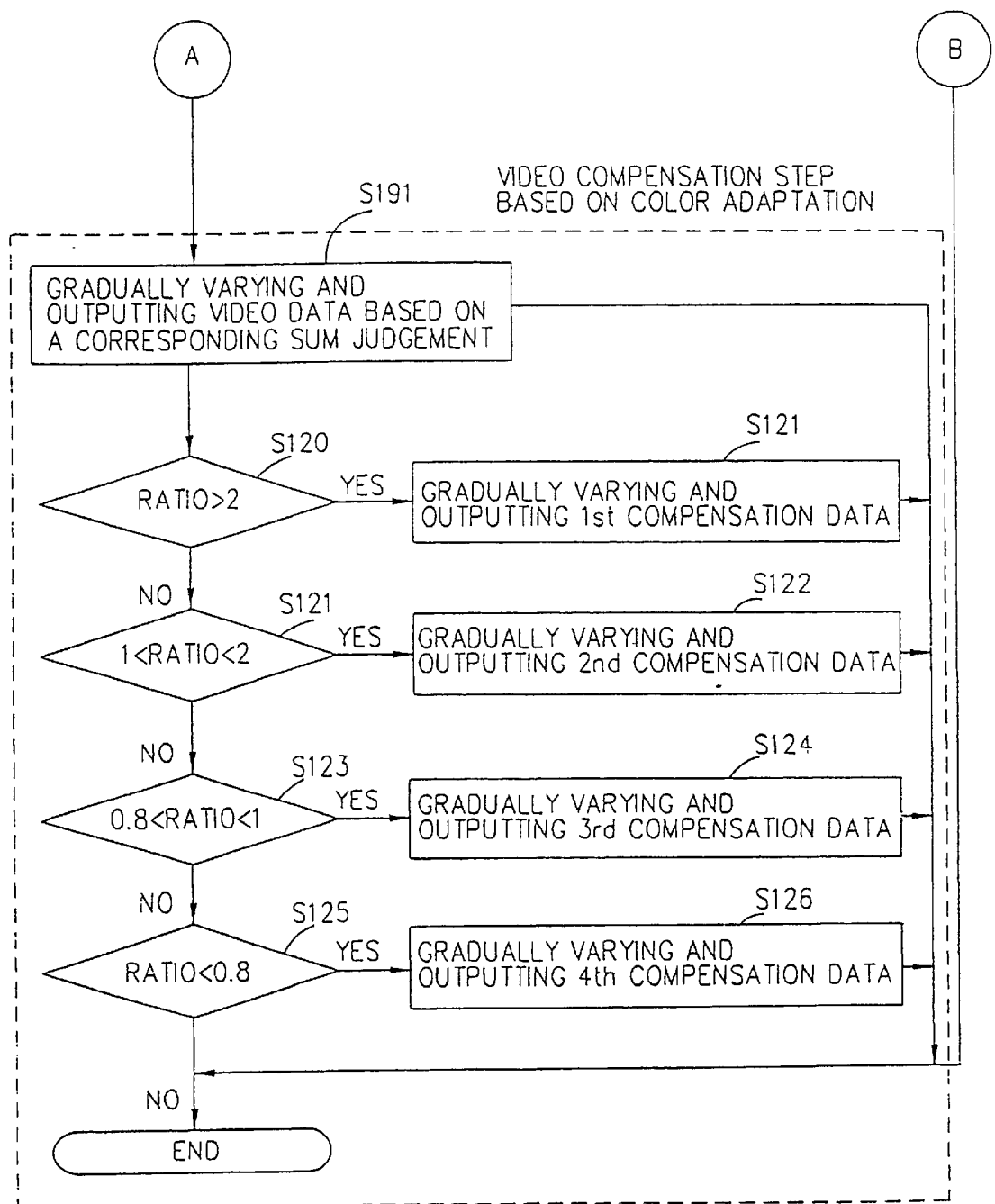

Particularly, as shown in FIG. 7B, when the color signal component ratio is Ratio>2, the first compensation data is gradually varied based on the color adaption phenomenon and then is outputted in Steps S120 and S121. When the color signal component ration is 1<Ratio<2, the second compensation data is gradually varied and outputted in Steps S121 and S122.

In addition, when the color, signal component ratio is 0.8<Ratio<1, and the color signal component ratio is Ratio<8, the third and fourth compensation data are gradually varied and outputted in Steps S123 through S126. That is, when the lighting condition is changed, the compensation data is varied step-by-step based on the color adaption of humans.

Therefore, the video signal processor 16 of the combined video processor 40 processes the video compensation data which is varied step-by-step by the microcomputer 300, and displays the compensated video signal on the screen of the color picture tube 17, so that any television viewer can enjoy a quality picture irrespective of the surrounding light variations.

In addition, the present invention provides a method for judging the surrounding light based on the ratio of the output voltages of the Cy and Ye sensors 21-1 and 21-2.

In this method, first, the two magnetic pole values of the output voltages Ye and Cy from the Cy and Ye sensors 21-1 and 21-2 are changed 10 to the three magnetic pole values of X, Y, and Z based on the international lighting committee (CIE) as follows:

$$\begin{bmatrix} X \\ Y \\ Z \end{bmatrix} = \begin{bmatrix} a_{11} & a_{12} \\ a_{21} & a_{22} \\ a_{31} & a_{32} \end{bmatrix} \cdot \begin{bmatrix} Y_e \\ C_y \end{bmatrix} = M \cdot \begin{bmatrix} Y_e \\ C_y \end{bmatrix} \quad \text{Equation 1}$$

$$M = \begin{bmatrix} 0.7619 & -0.0623 \\ 0.8111 & 0.0845 \\ -0.6667 & 1.3505 \end{bmatrix}$$

Therefore, it is possible to obtain an x-y coordinate of a light based on the values of X, Y and Z based on Equation 1:

$$x = \frac{X}{X+Y+Z}, \, y = \frac{Y}{X+Y+Z}, \, z = \frac{Z}{X+Y+Z} \quad \text{Equation 2}$$

Thereafter, Equation 2 is adapted to Equation 1 and then 10 the resultant value is divided by the magnetic pole value "Y" for thus obtaining the following expression:

$$\begin{bmatrix} \frac{X}{Y} \\ \frac{Y}{Y} \\ \frac{Z}{Y} \end{bmatrix} = \begin{bmatrix} \frac{x}{y} \\ 1 \\ \frac{z}{y} \end{bmatrix} = \frac{1}{Y} \begin{bmatrix} a_{11} & a_{12} \\ a_{21} & a_{22} \\ a_{31} & a_{32} \end{bmatrix} \cdot \begin{bmatrix} Y_e \\ C_y \end{bmatrix} \quad \text{Equation 3}$$

The first row and third row of Equation 3 are reversely changed, thus obtaining the following equation:

$$\begin{bmatrix} Y_e \\ C_y \end{bmatrix} = Y \cdot \begin{bmatrix} a_{11} & a_{12} \\ a_{31} & a_{32} \end{bmatrix}^{-1} \cdot \begin{bmatrix} x \\ y \\ \frac{z}{y} \end{bmatrix} \quad \text{Equation 4}$$

Therefore, an expression of $Y=a_{11}Y_e+a_{22}C_y$ is obtained. In addition, assuming the following condition is made based on Equation 3:

$$\begin{bmatrix} a_{11} & a_{12} \\ a_{31} & a_{32} \end{bmatrix}^{-1} = \begin{bmatrix} b_{11} & b_{12} \\ b_{21} & b_{22} \end{bmatrix}$$

The following Equation 5 is obtained:

$$\begin{bmatrix} Y_e \\ C_y \end{bmatrix} = (a_{21}Y_e + a_{22}C_y) \cdot \begin{bmatrix} b_{11} & b_{12} \\ b_{21} & b_{22} \end{bmatrix} \cdot \begin{bmatrix} x \\ y \\ \frac{z}{y} \end{bmatrix} \quad \text{Equation 5}$$

In addition, the relationship between the output voltages Ye and Cy of the Cy and Ye sensors 21-1 and 21-2 based on Equation 5 may be expressed as follows:

$$Y_e = \frac{b_{11x} + b_{12x}}{b_{21x} + b_{22x}} \cdot C_y \quad \text{Equation 6}$$

Figure 8:
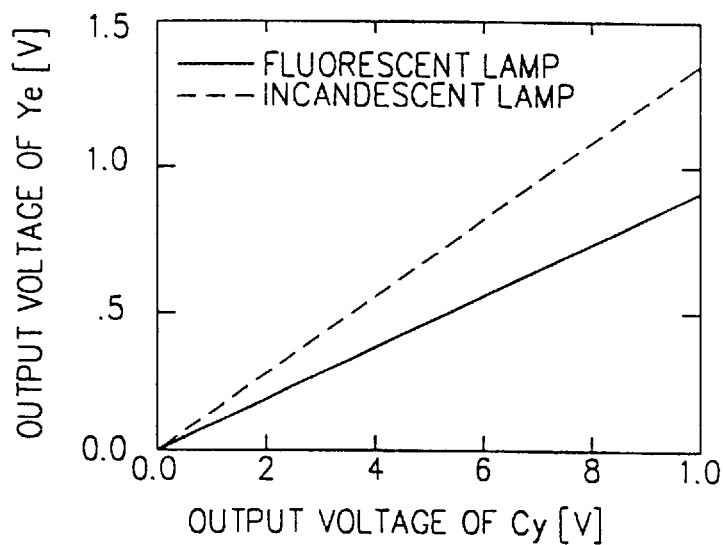
FIG. 8 is a graph illustrating an output voltage ratio between Ye and Cy with respect to an incandescent lamp and a fluorescent lamp according to one embodiment of the present invention.

Therefore, the ratios between the output voltages Ye/Cy with respect to the fluorescent lamp (x=0.313, y=0.332, W/B=6500° K) and the incandescent lamp (x=0.417, y=0.396, W/B=3300° K) are shown in FIG. 8. As a result, if the ratio of the voltage Ye with respect to the voltage Cy is about 1.4, this ratio corresponds to the incandescent lamp, and the ratio is about 0.9, the ratio corresponds to the fluorescent lamp.

In addition, an experiment was performed based on the output voltage ratio Ye/Cy at a color temperature range of 2000° K to −8000° K at every 100° K interval with respect to −10, 0, 10, 30 and 50MPCD in order to study the relationship between the output voltages Cy and Ye based on the color temperature W/B. As a result of the experiment, as the value of MPCD is increased, the output voltage ratio of Ye/Cy is increased. Even when the identical output voltage is provided, the color temperature is different.

Figure 9:
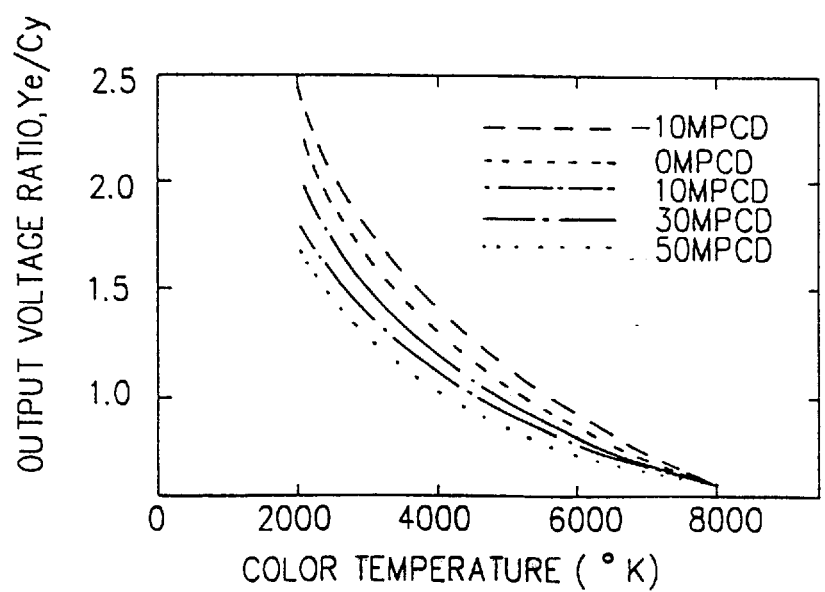
FIG. 9 is a graph illustrating an output voltage ratio between Ye and Cy based on a color temperature according to the present invention.

However, the color temperature range of the incandescent lamp with respect to the surrounding light source was 300° K to 4000< K, and the MPCD was about −10. The color temperature range of the fluorescent lamp was 6500° K to 7500< K, and the MPCD was 50 to 60. As shown in FIG. 9, the output voltage ratio of Ye/Cy in the case of the incandescent lamp was 1/17 to 1.39, and the output voltage ratio of Ye/Cy in the case of the fluorescent lamp was 0.88 to 0.97.

Figure 10:
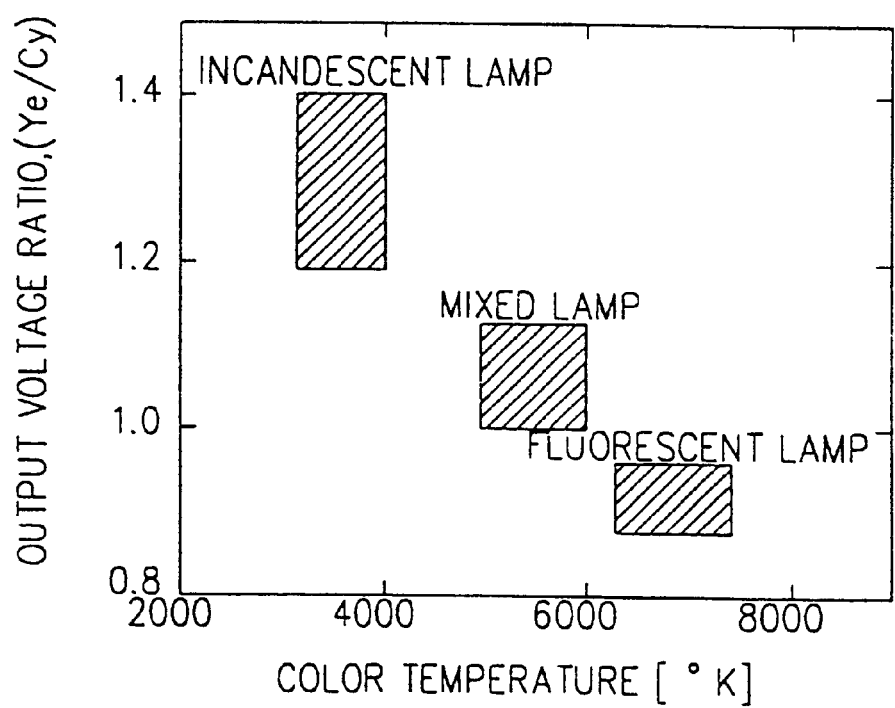
FIG. 10 is a view illustrating a judging level of a surrounding light source which is determined by an output voltage ratio of two photo sensors according to one embodiment of the present invention.

In addition, when the fluorescent lamp and the incandescent lamp are mixed, as shown in FIG. 10, the output voltage ratio is defined between the output voltage ratios of Ye/Cy of the incandescent lamp and the fluorescent lamp. Therefore, it is possible to recognize the kind of the surrounding light source using the output voltage ratio of the Cy and Ye sensors 21-1 and 21-2.

As described above, in the present invention, it is possible to secure the optimum picture quality by detecting the surrounding light environment near the video display instrument and automatically correcting the video data in accordance with any variation of the detected light and the lighting environment In addition, in the present invention, since only two outputs R" and B" are used, it is possible to reduce the number of ports of the input side from 3 to 2, and reduce the deviation due to the offset by adjusting the input and Output off set voltage.

Furthermore, it is possible to improve the picture quality by using the color adaptation phenomenon of humans and it is possible to accurately maintain the W/B with respect to a predetermined brightness from the high brightness to the low brightness using the color signal component ratio.

Although the preferred embodiments of the present invention have been disclosed for illustrative purposes, those skilled in the art will appreciate that various modifications, additions and substitutions are possible, without departing from the scope 10 and spirit of the invention as recited in the accompanying claims.

What is claimed is:

1. A surrounding light judging apparatus, comprising:
   a detector for detecting a first primary color component and a second primary color component of a surrounding light; and
   judging unit for judging kind of the light using the first and second color components without the use of a third primary color component of the surrounding light,
   wherein the first primary color component is a red color component of the light, and the second primary color component is blue color component of the light, and
   wherein the judging unit computes a ratio of the first and second primary color components and determines the kind of the surrounding light using the computed ratio.

2. The apparatus of claim 1, wherein the judging unit judges that the surrounding light is a florescent light if the ratio is between 1 and 2, judges that the surrounding light is an incandescent light if the ratio is less than 0.8.

3. The apparatus of claim 1, wherein the judging unit judges that the surrounding light is a day light if the ratio is greater than 2, and judges that the surrounding light is a mixture of a florescent light and an incandescent light if the ratio is between 0.8 and 1.

4. The apparatus of claim 1, wherein the judging unit computes a sum value (SUM) using the first and second primary color components of the surrounding light according to the following equation: SUM=R"+G"+B", wherein R" represents a digital value of the first primary color component, B" represents a digital value of the second primary color component, and G"=(R"+B")/3.

5. The apparatus of claim 4, further comprising:
   a video processor for performing a video compensation operation on a video signal using prestored video data setting values corresponding to the sum value and using prestored video compensation data corresponding to the judged kind of the surrounding light.

6. The apparatus of claim 5, wherein the video data setting values represent at least one of the following: contrast, brightness, saturation and sharpness.

7. The apparatus of claim 5, wherein the video compensation data identifies at least one of the following: a color temperature of the light, a tint of the light, and an x-axis of the light.

8. A video compensation control apparatus, comprising:
   a detector for detecting a first color component and a second color component of a surrounding light;
   a judging unit for judging a kind of the light using the first and second color components without the use of a third color component of the surrounding light;
   a memory unit for storing video compensation data in accordance with the judged kind of the surrounding light; and a video processor for receiving the video compensation data output from the memory unit in accordance with the kind of the surrounding light judged by the judging unit and performing a video compensation operation on a video signal using the video compensation data, wherein the first color component is a red color component of the light and the second color component is a blue color component of the light.

9. A surrounding light judging method, comprising the steps of:

detecting first primary color component and second primary color component of a surrounding light; and judging a kind of the light using the first and second color components without the use of a third primary color component of the surrounding light, wherein the first primary color component is a red color component of the light, and the second primary color component is a blue color component of the light, and wherein the judging step includes:
computing a ratio of the first and second primary color components; and
determining the kind of the surrounding light using the computed ratio.

10. The method of claim 9, wherein the judging step judges that the surrounding light is a florescent light if the ratio is between 1 and 2, and judges that the surrounding light is an incandescent light if the ratio is less than 0.8.

11. The method of claim 9, wherein the judging step judges that the surrounding light is a day light if the ratio is greater than 2, and judges that the surrounding light is a mixture of a florescent light and an incandescent light if the ratio is between 0.8 and 1.

12. The method of claim 9, wherein the judging step computes a sum value (SUM) using the first and second primary color components of the surrounding light according to the following equation: SUM=R"+G"+B", wherein R" represents a digital value of the first primary color component, B" represents a digital value of the second primary color component, and G"=(R"+B") /3.

13. The method of claim 12, further comprising:
performing a video compensation operation on a video signal using prestored video data setting values corresponding to the sum value and using prestored video compensation data corresponding to the judged kind of the surrounding light.

14. The method of claim 13, wherein the video data setting values represent at least one of the following: contrast, brightness, saturation and sharpness.

15. The method of claim 14, wherein the video compensation data identifies at least one of the following: a color temperature of the light, a tint of the light, and an x-axis of the light.

16. A video correction control method, comprising the steps of:

detecting a first color component and a second color component of a surrounding light;

computing a ratio between the first and second color components;

judging a kind of the surrounding light based on the computed ratio without the use of a third color component of the surrounding light; and compensating a video signal using video compensation data corresponding to the judged kind of the surrounding light, wherein the first and second components correspond to Ye and Cy components of the surrounding light, respectively.

17. The method of claim 16, further comprising the steps of:

detecting a variation in the surrounding light after the judging step; and maintaining current video data for a predetermined time when the variation in the surrounding light is detected to compensate for the variation.

18. The method of claim 17, wherein said video data, which is compensated, is varied step-by-step.

19. A color temperature determining apparatus, comprising:

color detection means for detecting first and second components of a color signal;

memory means for prestoring light data corresponding to different ratios of first and second components of color signals and color temperature data corresponding to different types of light;

light judging means for judging an output ratio of the detected first and second components of the color signal and retrieving light data corresponding to the judged output ratio from the memory means; and light-based color temperature determination means for determining a color temperature of a light in accordance with a result of the judgement performed by the light judging means without the use of a third component of the color signal, wherein the first and second components of the color signal correspond to Ye and Cy components of the color signal, respectively.

20. The apparatus of claim 19, wherein the light judging means determines that said light is an incandescent light if the output ratio of the detected first and second components of the color signal falls between 1/17 and 1.39, and determines that said light is a florescent light if the output ratio falls between 0.88 and 0.97.

21. A light classifying method, comprising the steps of:

obtaining a matrix for converting an output voltage from a color detector into three magnetic pole values of X, Y and Z which has a linear form;

obtaining an output voltage ratio of the color detector using a converted matrix coefficient and an X-Y coordinate of a predetermined light; and classifying the light in accordance with the obtained output voltage ratio.

22. A method of determining a color temperature based on a color signal, comprising the steps of:

prestoring light data corresponding to different ratios of first and second components of color signals and prestoring color temperature data corresponding to different types of light;

detecting first and second components of a received color signal;

determining an output ratio of the detected first and second components of the color signal;

retrieving light data from the prestored light data that corresponds to the determined output ratio; and determining a color temperature of a surrounding light in accordance with the retrieved light data using the prestored color temperature data and without the use of a third component of the color signal, wherein the first and second components of the color signal correspond to Ye and Cy components of the color signal, respectively.

23. The method of claim 22, further comprising:
determining that said light is an incandescent light if the output ratio of the detected first and second components of the color signal falls between 1/17 and 1.39 and
determining that said light is a florescent light if the output ratio falls between 0.88 and 0.97.

24. A surrounding light judging apparatus, comprising:
a detector for detecting a first primary color component and a second primary color component of a surrounding light; and
a judging unit for judging a kind of the light using the first and second color components without the use of a third primary color component of the surrounding light,
wherein the judging unit computes a ratio of the first and second primary color components and determines the kind of the surrounding light using the computed ratio, and
wherein the judging unit judges that the surrounding light is a florescent light if the ratio is between 1 and 2, and judges that the surrounding light is an incandescent light if the ratio is less than 0.8.

25. A surrounding light judging apparatus, comprising:
a detector for detecting a first primary color component and a second primary color component of a surrounding light; and
a judging unit for judging a kind of the light using the first and second color components without the use of a third primary color component of the surrounding light,
wherein the judging unit computes a ratio of the first and second primary color components and determines the kind of the surrounding light using the computed ratio, and
wherein the judging unit judges that the surrounding light is a day light if the ratio is greater than 2, and judges that the surrounding light is a mixture of a florescent light and an incandescent light if the ratio is between 0.8 and 1.

26. A surrounding light judging apparatus, comprising:
a detector for detecting a first primary color component and a second primary color component of a surrounding light; and
a judging unit for judging a kind of the light using the first and second color components without the use of a third primary color component of the surrounding light,
wherein the judging unit computes a ratio of the first and second primary color components and determines the kind of the surrounding light using the computed ratio, and
wherein the judging unit computes a sum value (SUM) using the first and second primary color components of the surrounding light according to the following equation: SUM=R"+G"+B", wherein R" represents a digital value of the first primary color component, B" represents a digital value of the second primary color component, and G"=(R"+B")/3.

27. A surrounding light judging apparatus, comprising:
a detector for detecting a first primary color component and a second primary color component of a surrounding light; and
a judging unit for judging a kind of the light using the first and second color components without the use of a third primary color component of the surrounding light,
wherein the judging step includes:
computing a ratio of the first and second primary color components; and
determining the kind of the surrounding light using the computed ratio, and
wherein the judging step judges that the surrounding light is a florescent light if the ratio is between 1 and 2, and judges that the surrounding light is an incandescent light if the ratio is less than 0.8.

28. A surrounding light judging apparatus, comprising:
a detector for detecting a first primary color component and a second primary color component of a surrounding light; and
a judging unit for judging a kind of the light using the first and second color components without the use of a third primary color component of the surrounding light,
wherein the judging step includes:
computing a ratio of the first and second primary color components; and
determining the kind of the surrounding light using the computed ratio, and
wherein the judging step judges that the surrounding light is a day light if the ratio is greater than 2, and judges that the surrounding light is a mixture of a florescent light and an incandescent light if the ratio is between 0.8 and 1.

29. A surrounding light judging apparatus, comprising:
a detector for detecting a first primary color component and a second primary color component of a surrounding light; and
a judging unit for judging a kind of the light using the first and second color components without the use of a third primary color component of the surrounding light,
wherein the judging step includes:
computing a ratio of the first and second primary color components; and
determining the kind of the surrounding light using the computed ratio, and
wherein the judging step computes a sum value (SUM) using the first and second primary color components of the surrounding light according to the following equation: SUM=R"+G"+B", wherein R" represents a digital value of the first primary color component, B" represents a digital value of the second primary color component, and G"=(R"+B")/3.

30. A color temperature determining apparatus, comprising:
color detection means for detecting first and second components of a color signal;
memory means for prestoring light data corresponding to different ratios of first and second components of color signals and color temperature data corresponding to different types of light;
light judging means for judging an output ratio of the detected first and second components of the color signal and retrieving light data corresponding to the judged output ratio from the memory means; and
light-based color temperature determination means for determining a color temperature of a light in accordance with a result of the judgement performed by the light judging means,
wherein the first and second components of the color signal correspond to Ye and Cy components of the color signal, respectively, and
wherein the light judging means determines that said light is an incandescent light if the output ratio of the detected first and second components of the color signal falls between 1/17 and 1.39, and determines that said light is a florescent light if the output ratio falls between 0.88 and 0.97.

31. A method of determining a color temperature based on a color signal, comprising the steps of:

prestoring light data corresponding to different ratios of first and second components of color signals and prestoring color temperature data corresponding to different types of light;

detecting first and second components of a received color signal;

determining an output ratio of the detected first and second components of the color signal;

retrieving light data from the prestored light data that corresponds to the determined output ratio;

determining a color temperature of a surrounding light in accordance with the retrieved light data using the prestored color temperature data, wherein the first and second components of the color signal correspond to Ye and Cy components of the color signal, respectively;

determining that said light is an incandescent light if the output ratio of the detected first and second components of the color signal falls between 1/17 and 1.39; and determining that said light is a florescent light if the output ratio falls between 0.88 and 0.97.

* * * * *